United States Patent [19]

Seaburg

[11] Patent Number: 4,859,982
[45] Date of Patent: Aug. 22, 1989

[54] WIRELESS TAILLIGHT SYSTEM

[76] Inventor: Stephen L. Seaburg, 4021 Cedar Run Rd., Traverse City, Mich. 49684

[21] Appl. No.: 141,563

[22] Filed: Jan. 7, 1988

[51] Int. Cl.⁴ .............................................. B60Q 1/26
[52] U.S. Cl. .................................... 340/475; 340/473; 307/10.8; 362/61
[58] Field of Search .................... 340/52 R, 67, 73.74, 340/81 R, 66; 362/61, 233; 307/10 L S

[56] References Cited

U.S. PATENT DOCUMENTS

| 4,712,167 | 12/1987 | Gordin et al. | 362/233 |
| 4,722,030 | 1/1988 | Bowden | 362/233 |

FOREIGN PATENT DOCUMENTS 2726322  12/1977  Fed. Rep. of Germany ........ 340/74

Primary Examiner—Joseph A. Orsino
Assistant Examiner—Jeffery A. Hofsass
Attorney, Agent, or Firm—Douglas S. Bishop

[57] ABSTRACT

A wireless taillight system including a transmit module adapted to receive taillight control signals from a towing vehicle and provide radio frequency control signals corresponding thereto. The system also includes a pair of taillight modules adapted to be mounted upon a towed vehicle. The taillight modules receive control signals from the transmit module and energize a taillight system contained therein. The system is adapted to provide run, stop and turn signal functions to a towed vehicle. The invention is registered under the Disclosure Document Program as Disclosure Document No. 171509.

11 Claims, 6 Drawing Sheets

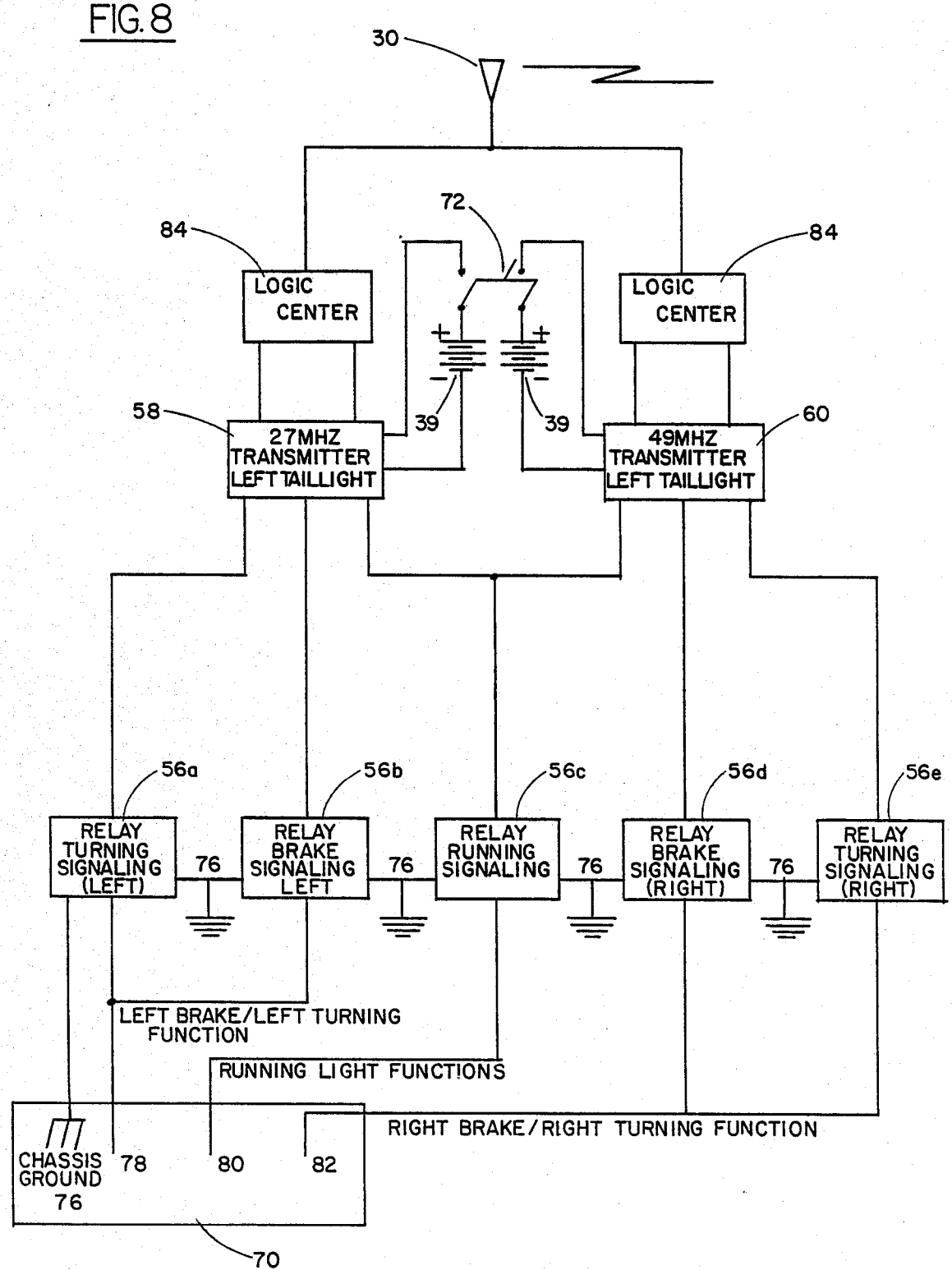

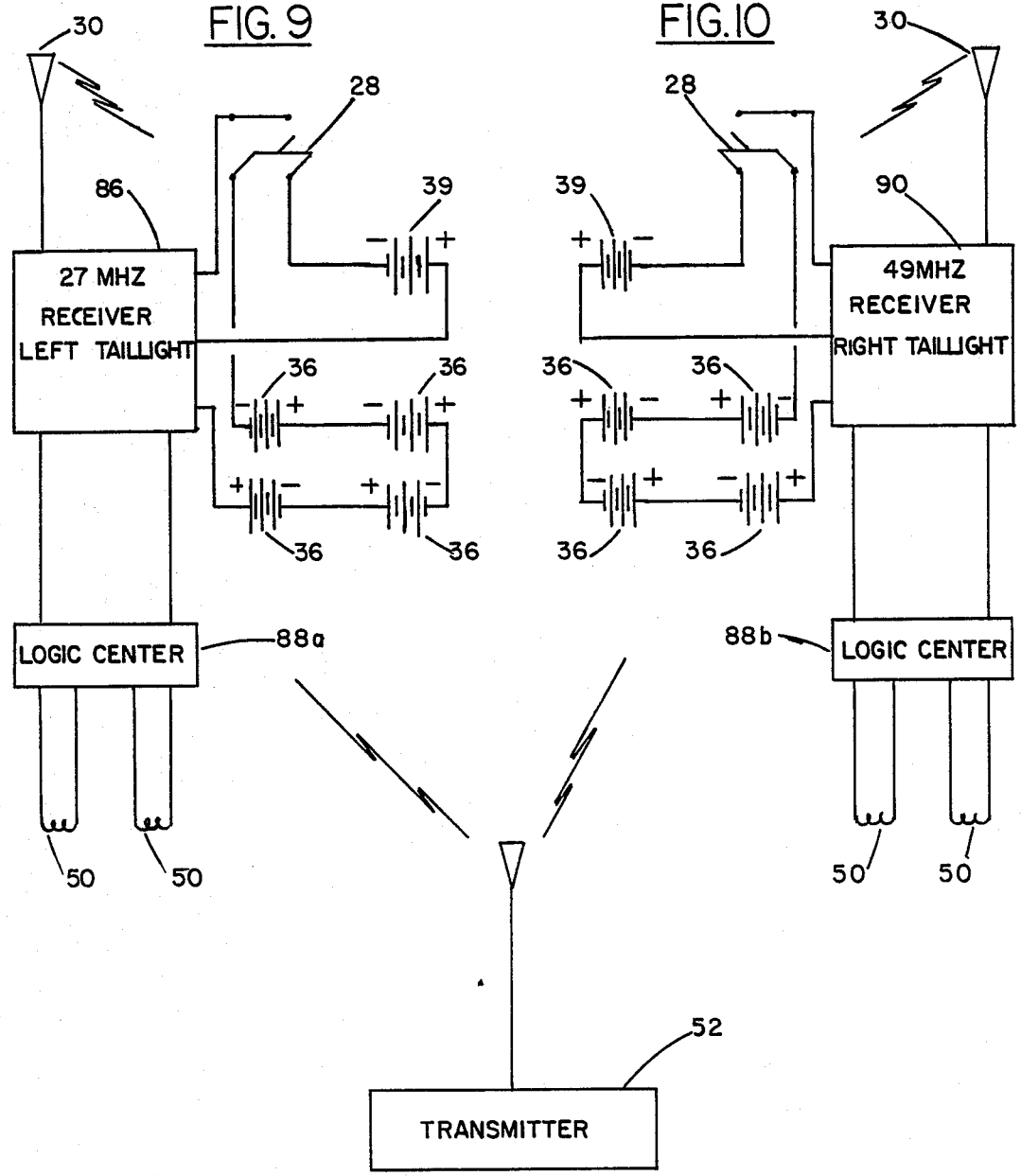

WIRELESS TAILLIGHT SYSTEM

FIELD OF THE INVENTION

This invention relates generally to signals and in particular to taillight signals of the type deployed on vehicles to indicate running, turning or stopping conditions. Most particularly, the present invention relates to a wireless taillight system wherein a controller utilizes radio frequency energy to control the operation of remotely disposed taillight modules.

BACKGROUND OF THE INVENTION

Taillights are an important safety system in vehicles, particularly motor vehicles. Such lights indicate the operating condition of the vehicle and warn following drivers of upcoming stops and turns. It is generally mandated by law that vehicles operating on public roadways be equipped with adequate taillight systems.

Hazards can occur when a first vehicle is towing a trailer or a second vehicle because the towed vehicle tends to obscure the taillights of that first vehicle. In such situations, safety as well as law requires that the towed vehicle also be provided with adequate taillight systems. Toward this end, many trailers or regularly towed vehicles are equipped with wired-in taillight systems which include a jack or similar connector adapted to interface with the electrical system of the towing vehicle so as to energize the towed vehicle's lighting system in synchrony therewith. While such systems are in very widespread use, they do present problems insofar as the connector jacks tend to corrode or break off and wiring of the auxiliary taillight system tends to fail, often while the vehicle is being towed.

Greater difficulties are encountered when a first vehicle is towing a second in an emergency situation because connector jacks are generally not found on most motor vehicles and establishing an interconnection between the taillight systems of the respective vehicles entails expenditure of time and effort. Furthermore, in an emergency situation it is frequently found that the vehicle to be towed has sustained damage to its taillight system precluding any such interconnection.

Difficulties are also occasioned by failures of preinstalled taillight systems on trailers and the like due to broken connections, blown fuses, damaged bulbs and so forth. Frequently such damage occurs on the road remote from a repair facility and such failure is most significant under conditions of darkness or limited visibility which further complicate repair of the taillight system.

The foregoing problems could be simply and easily obviated if there were available a system for providing taillight function to trailers or other towed vehicles, which system does not necessitate extensive electrical connection to the towed vehicle. It is further desired that such system be readily adaptable to be used in conjunction with a variety of towed vehicles and not be dependent upon any electrical or mechanical components thereof for its function. The present invention provides for a wireless taillight system having a transmitting module disposed in a towing vehicle and energized by the taillight circuitry thereof so as to broadcast electromagnetic control signals to a pair of taillight modules which may be mounted upon the towed vehicle.

By the use of the present invention, taillight function, including run, stop and turn functions, may be provided to any towed vehicle without the necessity of establishing separate electrical communication. For example, the wireless taillight system may be carried in tow trucks or other emergency vehicles and the wireless modules attached to towed vehicles to warn those following. Similarly, the system may be employed in conjunction with tractor-trailer trucks as an adjunct or emergency lighting system to be used in the event of failure of the trailer's lights. These and other advantages of the present invention will be readily apparent to one of skill in the art in light of the drawings, discussion, description and claims which follow.

SUMMARY OF THE INVENTION

There is disclosed herein a wireless taillight system comprising a transmitting module adapted to be disposed in operative association with the taillight energizing circuitry of a vehicle. The transmitting module includes input means operatively connected to taillight energizing circuitry and adapted to receive taillight energizing signals therefrom; a signal generator adapted to generate radio frequency control signals in response to the energizing signals and an antenna adapted to broadcast the radio frequency control signals. The system further includes a taillight module disposed remote from the transmitting module and including a radio receiver-decoder adapted to receive the radio frequency control signal broadcast by the antenna and generate lamp control signals corresponding thereto and signaling means including a signal lamp and lamp controller, said controller adapted to receive the lamp control signals and energize the lamp in response thereto.

The signal generator may be adapted to broadcast two discrete sets of radio frequency control signals at two discrete frequencies. The first set of signals will correspond to energizing signals provided to the right side taillights of the vehicle and a second set of radio frequency control signals will correspond to energizing signals provided to the left side taillights of the vehicle. In this embodiment, the system further includes two taillight modules, the first adapted to receive the first set of radio frequency control signals and the second adapted to receive the second set of radio frequency control signals. In one specific embodiment, the first set of radio frequency control signals are broadcast at approximately 27 MHZ and the second set of signals at approximately 49 MHZ.

The input means may be adapted to receive taillight energizing signals corresponding to run, stop and turn functions, and a signal generator may be adapted to provide differing radio frequency control signals for each of the taillight energizing signals. The system may further include an input jack adapted to connect the transmitting module to the taillight energizing circuitry of the vehicle as well as a magnetic mount adapted to affix the taillight modules to a metallic surface.

BRIEF DESCRIPTION OF THE DRAWINGS

FIG. 8 is a block diagram of one particular circuit which may be used in the practice of the present invention;

FIG. 9 is a block diagram of one particular left taillight receiving circuit; and FIG. 10 is a block diagram of one particular right taillight receiving circuit.

DETAILED DESCRIPTION OF THE INVENTION

Figure 1:
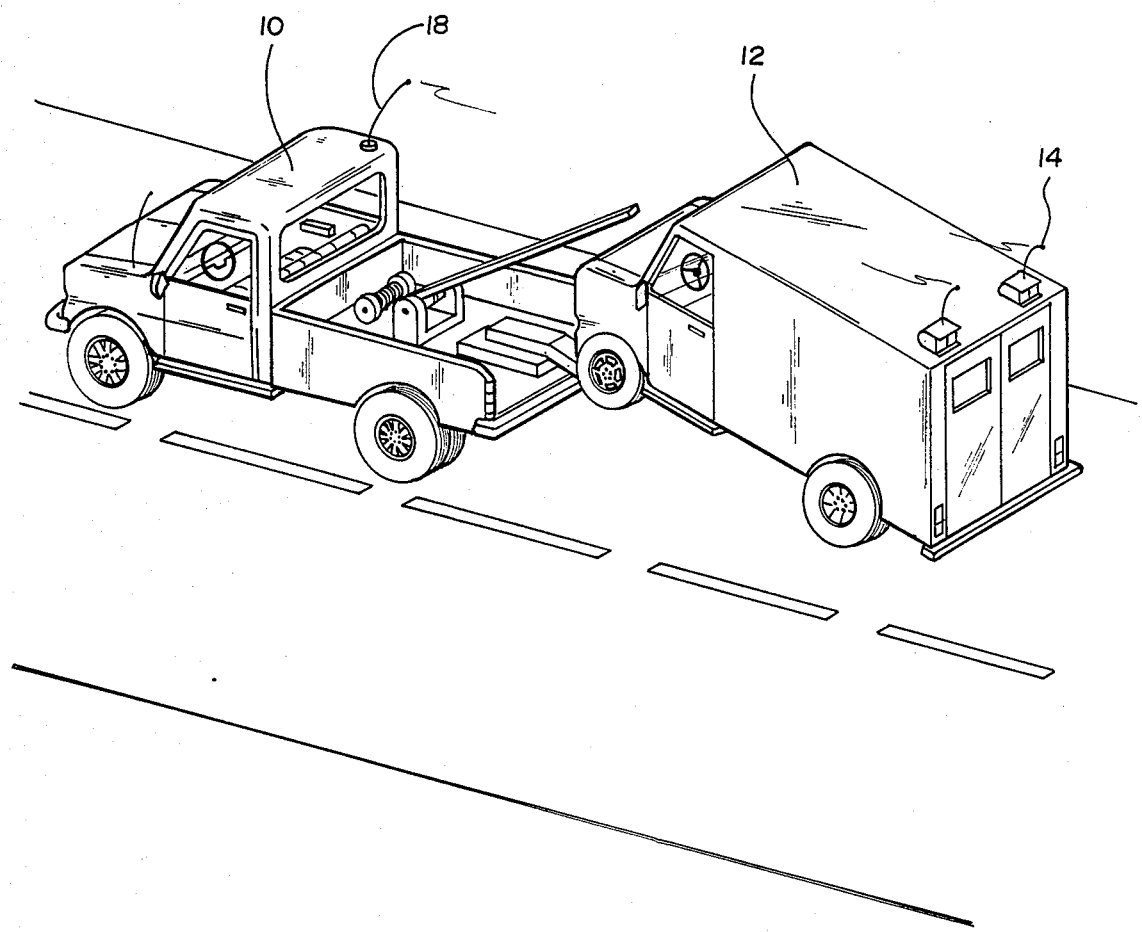
FIG. 1 is a perspective view illustrating one application in which the wireless taillight system may be advantageously employed.

FIG. 1 depicts the use of the wireless taillight system of the present invention in connection with the towing of a disabled vehicle. As mentioned previously, it is necessary to provide taillight function for towed vehicles and, heretofore, providing such function involved interconnecting the taillight circuitry of the towed vehicle with that of the towing vehicle. As depicted in FIG. 1, such interconnection is not necessary when the present invention is employed.

As shown, a tow truck 10 is towing a disabled vehicle 12 which has disposed thereatop a pair of wireless taillight modules 14, 16. Associated with the tow truck 10 is a transmit module having an antenna thereof 18 mounted atop the tow truck roof.

As will be described in greater detail hereinbelow, the transmit module is interconnected to the taillight energizing system of the tow truck 10 and is adapted to generate control signals responsive to the operation of the taillights of the tow truck 10. These control signals are broadcast from the antenna 18 and received by the taillight modules 14, 16 which decode these signals and operate the taillight bulbs associated therewith in response so as to provide taillight function corresponding to that of the tow truck 10. It should be kept in mind that while the modules 14, 16 are shown as mounted upon the roof of the disabled vehicle 12, they may be mounted with equal advantage upon the side or rear surface of that vehicle.

Figure 2:
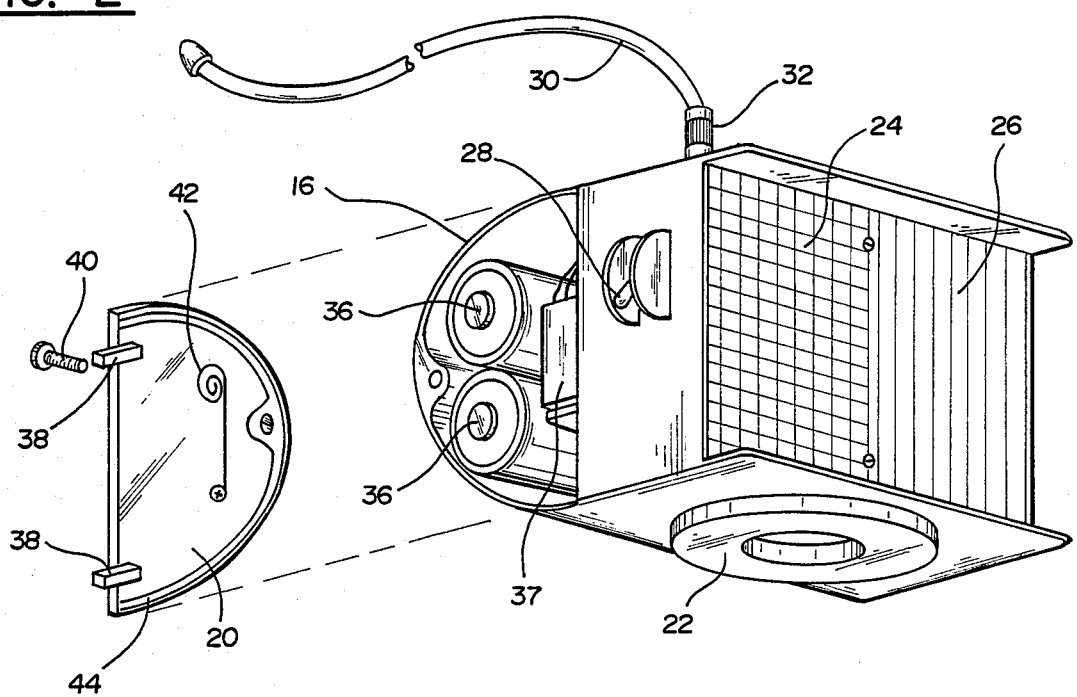
FIG. 2 is a partially exploded perspective view of a left taillight module illustrating the front and a first side thereof.
Figure 3:
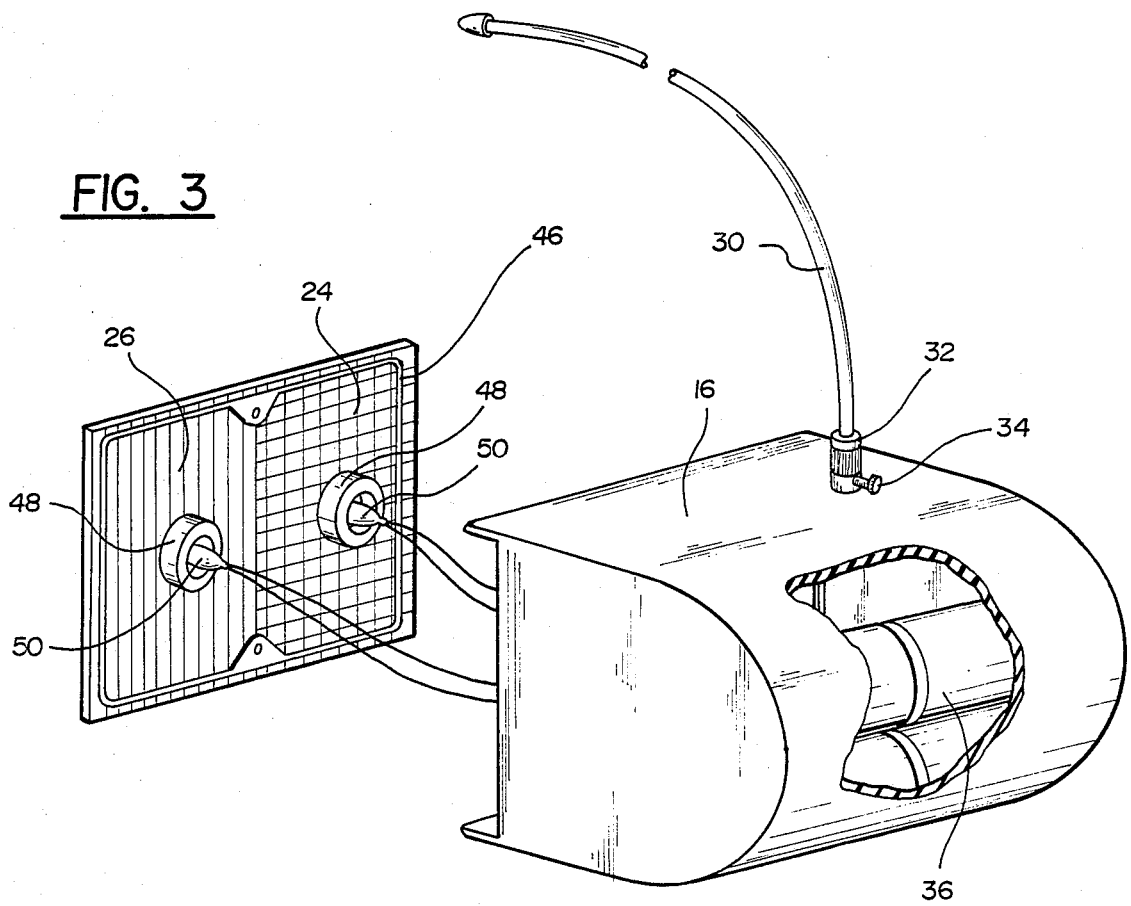
FIG. 3 is a partially exploded perspective view of the module of FIG. 2 illustrating a second side and rear surface thereof.

Referring now to FIG. 2 and 3, there is shown a left taillight module 16. FIG. 2 shows a view of the module 16 illustrating the rear, left side, and bottom surface thereof. As illustrated, the battery compartment cover 20 is removed to show the location of some of the cells utilized to power the module 16. The module includes a magnet 22 mounted upon the bottom surface thereof and adapted to hold the module 16 to the surface of a vehicle. In this particular embodiment, the magnet 22 is a permanent magnet having an approximately 35 pound pull. Obviously, other magnets may be employed as well as other mounting means such as suction cups, clamps, screws and the like. The module includes a pair of lenses 24, 26. In this embodiment, the first lens 24 is a yellow-colored prismatic lens fabricated from a durable plastic material and is used in conjuction with a light bulb disposed therebehind to indicate the "run" or normal operational condition of the vehicle. The second lens 26 is a red-colored prismatic lens fabricated from a durable transparent plastic material and is operative in conjunction with a light bulb disposed therebehind to indicate "stop" or "turn" function. The module further includes a switch 28 for energizing the various electrical components thereof. Mounted atop the module is an antenna 30 for receiving control signals for operating the module. As illustrated, the antenna 30 is a flexible member and is affixed to the module by means of a sleeve 32 having a thumb screw 34 associated therewith. In this manner, the antenna 30 may be removed from the module for replacement or storage.

The circuitry and lamps of the module which will be described in greater detail hereinbelow, are energized by a set of batteries, two of which are visible in the illustration. The batteries are preferably 1.5 volt cells 36, and are housed in a battery compartment within the module 16 and enclosed by a battery compartment door 20. As illustrated, the door 20 includes a pair of mounting lugs 38 which operate in cooperation with a thumb screw 40 to affix the door 20 to the module 16. Included on the door 20 is a battery cross-over 42 for establishing a series of current path through the batteries 36. As illustrated, the door 20 may also preferably include a rubber gasket 44 to seal the compartment from the ambient atmosphere.

Referring to FIG. 3, there is shown a front view of the module 16 better illustrating the right side and top thereof. In the FIG. 3 illustration, the lenses 24 and 26 are shown in exploded away relationship with the main body of the module 16. It will be noted that the lenses 24, 26 include a rubber sealing gasket 46 associated therewith, as well as a pair of bulb holders 48, each having a light bulb 50 associated therewith. As illustrated, the bulb holders 48 are formed from a flexible plastic material mounted upon the lenses 24, 26 and retain the bulbs 50 in a pressed-in relationship. Obviously, other designs of lamp holder may be employed. For example, the holders 48 may be permanently mounted within the module 16 in spaced apart relationship from the lens. FIG. 3 also shows a cut-away view of the battery compartment of the module 16 illustrating the manner in which the battery power system thereof is deployed.

Figure 4:
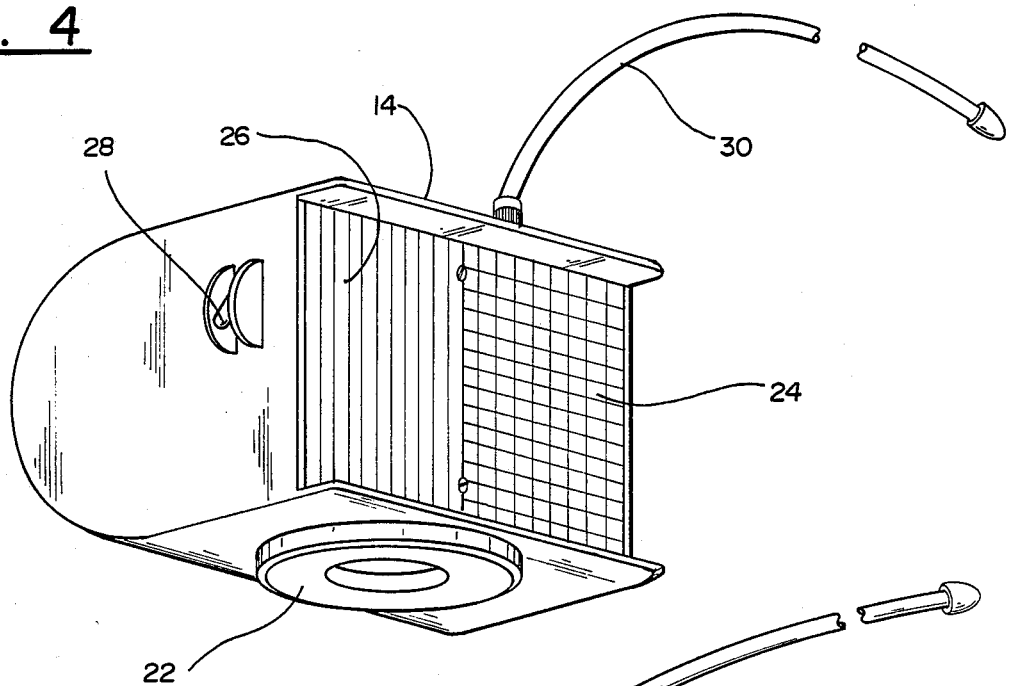
FIG. 4 is a perspective view of a right taillight module.
Figure 5:
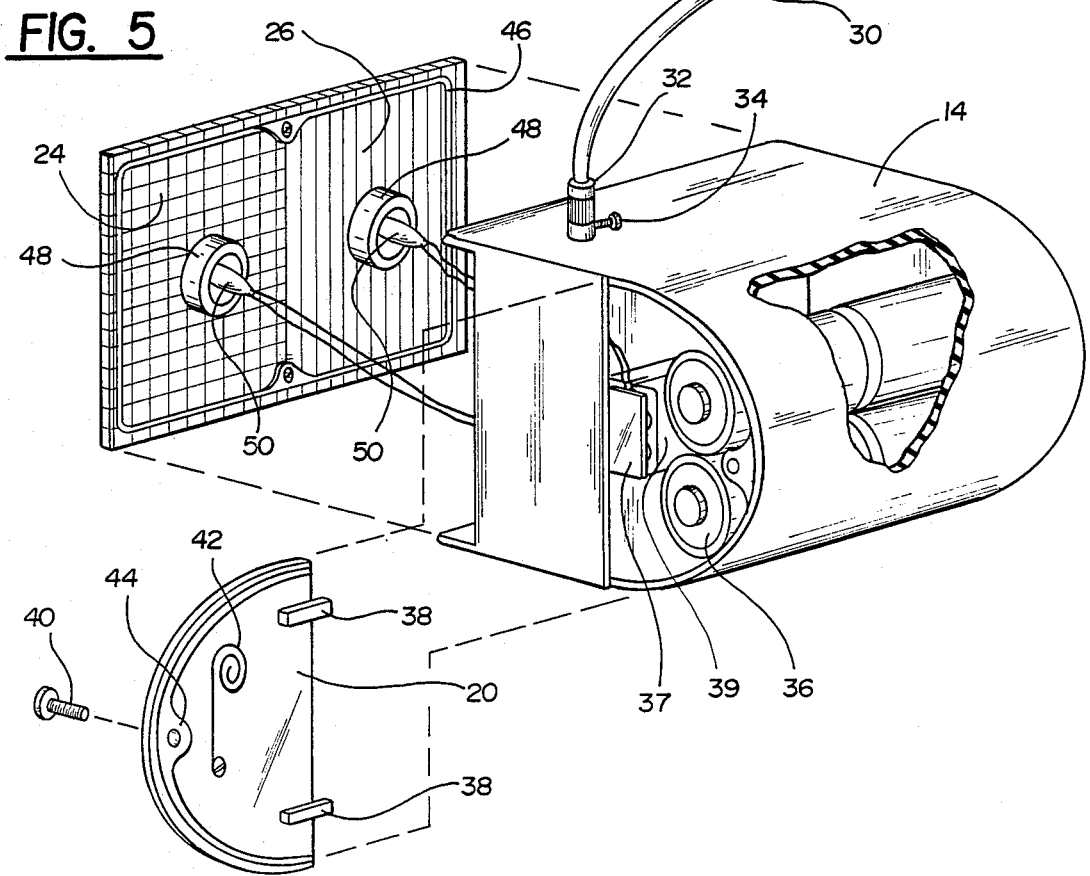
FIG. 5 is a rear perspective view partially exploded and partially cut away of the module of FIG. 4 illustrating the battery compartment thereof.

Referring now to FIGS. 4 and 5, there is shown a right taillight module 14. This module is basically a mirror image of the left module 16 illustrated with reference to FIGS. 2 and 3 and accordingly similar features will be referred to by similar reference numerals. What is better illustrated in FIG. 5 is the 9-volt battery 39 and battery connector 37 used to power the radio circuitry of the module and as disposed within the battery compartment.

Figure 6:
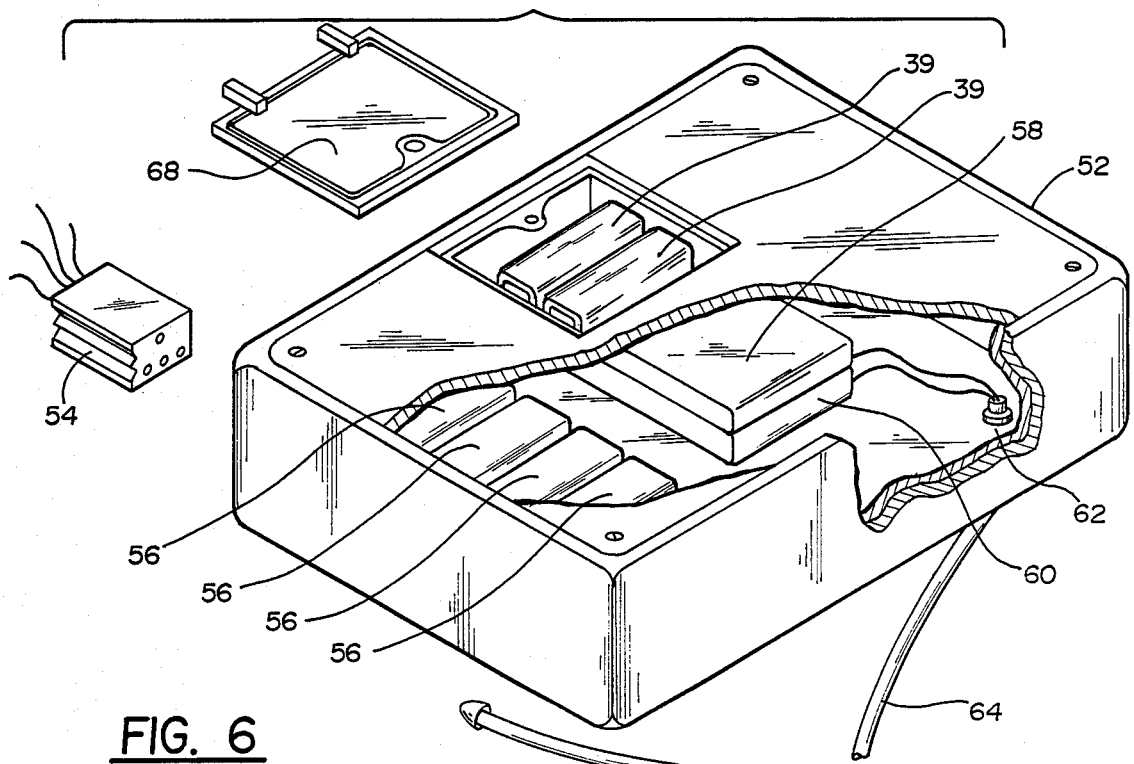
FIG. 6 is a partially exploded perspective view taken from the bottom of a transmitting module.
Figure 7:
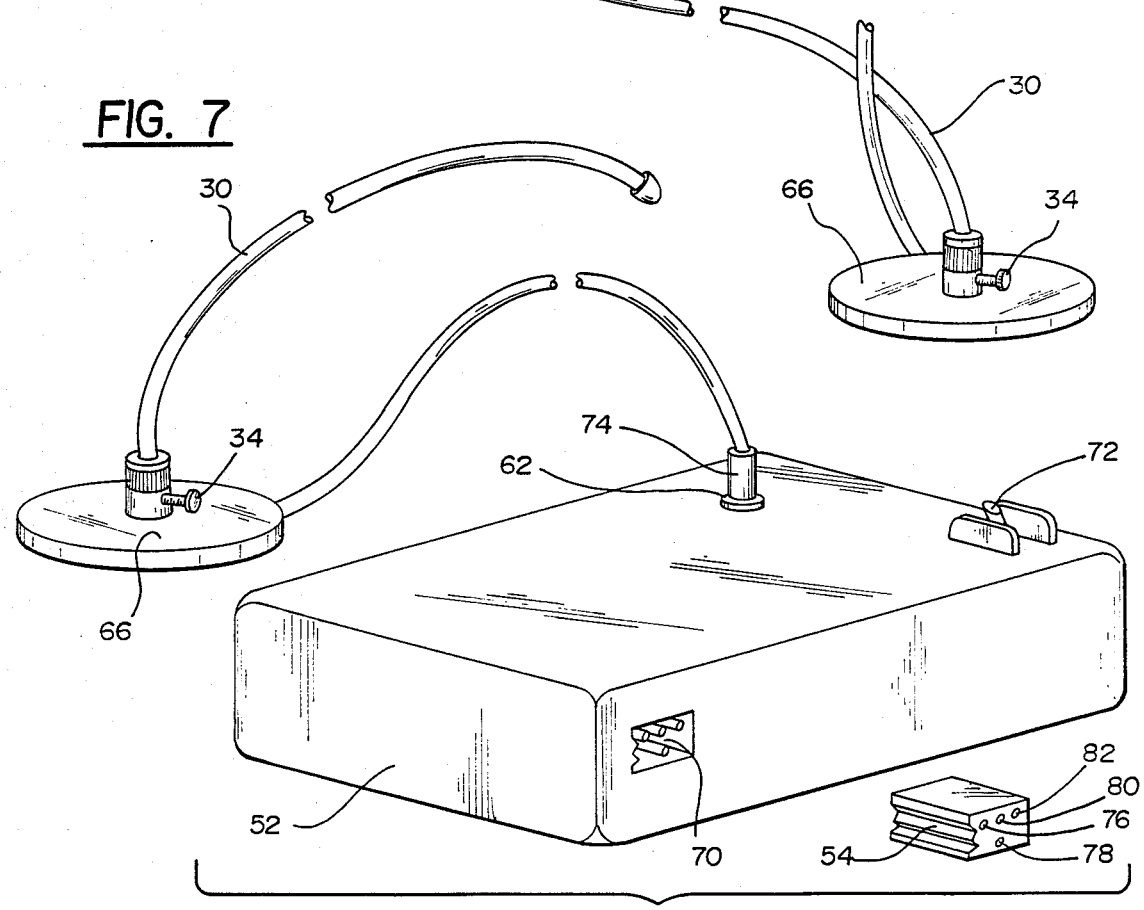
FIG. 7 is a top perspective view of the transmitting module of FIG. 6.

As mentioned previously, the wireless taillight system of the present invention also includes a transmitter module adapted to receive taillight control signals from the taillight circuitry of a vehicle and transmit radio frequency signals corresponding thereto to the taillight modules. FIGS. 6 and 7 depict one embodiment of a transmit module 52 structured in accord with the principles of the present invention.

Referring now to FIG. 6, there is shown a bottom rear perspective view of a transmit module, cut-away to show various interior components thereof. The module 52 is adapted to interconnect to the taillight control circuitry of a motor vehicle by means of a jack 54 of conventional design or any other such connector.

The transmit module 52 further includes five 12-volt relays 56, four of which are visible in the cut-away drawing. These relays are activated by the taillight circuitry of the towing vehicle and are operative to activate respective transmitters to broadcast control signals to the taillight modules, as will be explained in greater detail with reference to FIG. 8 hereinbelow. Also visible in this cut-away view are a pair of radio frequency transmitters 58, 60. The first transmitter 58 is operative to transmit signals at 27 MHZ for activation of the left taillight module and the second transmitter 60 is operative at 49 MHZ to activate the right taillight module. Obviously, these frequencies may be readily varied by one of skill in the art. The transmitters are in electrical communication with an antenna terminal 62 having an antenna 30 coupled thereto by a means of an antenna lead 64.

The antenna 30 may be of conventional design and in this regard resembles the antenna associated with the taillight module. As illustrated, the antenna 30 is demountable from a base 66 by means of a thumb screw 34. The base 66 may include a magnet (not illustrated herein) to allow mounting thereof upon a vehicle surface. In some instances it may be found expeditious to permanently mount the antenna on the vehicle as, for example, an emergency towing vehicle.

The transmit module 52 further includes a pair of 9-volt batteries 39 for energizing the radio frequency transmitters 58, 60. The batteries 39 are housed with a battery compartment accessible through a battery compartment door 68 which may be generally similar to that previously described.

Referring now to FIG. 7, there is shown a top, front view of the transmitter 52 better illustrating the manner in which the jack 54 interconnects the module 52 to the taillight control circuitry of the towing vehicle. In this regard, the transmitter module 52 includes a connector 70 having a plurality of pins adapted to mate with the jack 54, and its corresponding input lines comprising a ground line 76, a left brake and turn line 78, a running light line 80, and a right brake and turn line 82. Also depicted in FIG. 7 is an ON/OFF switch 72 for activating or deactivating the circuitry of the module. While module 52 is illustrated as being interconnected to the taillight control circuitry of a towing vehicle by means of a jack 54 and connector 70, it may be advantageous in particular situations to permanently interconnect the transmit module to the towing vehicle control circuitry and in this regard, the entire circuitry thereof may be included in the towing vehicle at the time of its assembly. Such an arrangement is particularly advantageous in tow trucks and other such emergency vehicle. As is shown in FIG. 7, the antenna cable 64 may be connected to the module 52 by means of a jack 74 adapted to mate with the antenna terminal 62 to enable ready connection and disconnection of the antenna 30.

Referring now to FIG. 8, there is shown a block diagram of one embodiment of a transmit module generally similar to that illustrated with reference to FIGS. 6 and 7 and accordingly, similar features will be referred to by similar reference numerals.

The transmit module includes a plurality of input lines 70 corresponding generally to the connector shown previously. These input lines comprise a ground line 76, a left brake and turn line 78, a running light line 80 and a right brake and turn line 82. Each one of the input lines communicates directly with a relay 56 which in turn energizes one of the transmitters in response thereto so as to broadcast control signals to the taillight modules.

A first relay 56a signals the left taillight transmitter 58 to cause it to generate left turn, radio frequency signals. It will be noted that the transmitter 58 has associated therewith a logic center 84 which comprises control circuitry to appropriately encode the radio frequency signal from the transmitter to enable it to appropriately signal the taillight module. For example, the logic center may operate in a digital mode to provide a digitally encoded signal corresponding to the appropriate function as, for example, the left turn function. Additionally, the logic center may further encode the signal so as to prevent stray radio frequency signals from erroneously energizing the taillight module. Such encoding technology is well-known to those of skill in the art and, for example, may be similar to such technology employed in conjunction with items as diverse as radio controlled garage door openers, cordless telephones and the like. The left taillight transmitter 58 also has a left brake relay 56b also in electrical communication therewith for energizing it to transmit braking signals.

In a similar manner, the right taillight transmitter which operates at 49 MHZ has in communication therewith a right brake relay 56d and a right turning signal 56e and further has associated therewith its own logic center 84. A fifth relay 56c controls the running light functions and is in electrical communication with both transmitters 58, 60 insofar as the left and right running lights are simultaneously activated.

It will also be noted from the block diagram on FIG. 8 that there is included an antenna 30 as well as a pair of batteries 39, each adapted to energize one of the transmitters 58, 60 and having associated therewith a switch 72 as previously described.

Referring now to FIG. 9, there is shown in block diagram form one embodiment of circuitry which may be employed in a left taillight module generally similar to that previously described. The module of FIG. 9 is adapted to receive signals broadcast from a transmit module and toward this end includes a receiver 86 having an antenna 30 associated therewith and operative to receive broadcast signals of approximately 27 MHZ. The receiver also has associated therewith a logic center 88a. The logic center 88a is operative to decode the broadcast signal and generate an appropriate lamp control signal to activate brake, turn or run lamp functions. The logic center 88a further includes a lamp control means such as a circuit or relay adapted to activate the appropriate lamp 50 in response to the lamp control signals.

The circuitry of the receive module is energized by a dual set of batteries. In this particular embodiment, the radio receiver itself is energized by a 9-volt battery 39 while the lamps 50 are powered by a series disposed string of four 1.5-volt batteries 36. The module further includes a switch 28 adapted to control the supply of power to the receiver 86 and lamps 50.

FIG. 10 depicts in block diagram form the circuitry of a right taillight module. The circuitry is generally similar to that illustrated with respect to FIG. 9 except that the receiver 90 is adapted to receive 49 MHZ signals and the logic center 88b is adapted to decode those signals and control the lamps 50 in accord with the received 49 MHZ signals. The circuitry of FIG. 10 includes a power supply having batteries 36 and 39 and a switch 28 generally similar to that previously described.

The foregoing describes one particular embodiment of wireless taillight system structured in accord with the principles of the present invention. Obviously, modifications thereto will be apparent to one of skill in the art. There are a number of frequencies other than the selected 27 and 49 MHZ frequencies which may be similarly employed. Likewise, the system may be modified to operate entirely on one frequency by appropriately encoding and decoding the control signals; and as previously discussed, these signals may be encoded to prevent erroneous or unauthorized triggering of the taillight module. In a particular embodiment, the system may rely upon infrared rather than radio frequency energy. For example, the transmit module 52 may be adapted to provide appropriately coded infrared signals by driving an infrared emitting diode; and, the receiver may include a photocell adapted to receive this infrared signal. While the system is depicted as operating from self-contained batteries, it may be advantageous in some situations to power at least the transit module from the power system of the towing vehicle. In other embodiments, the battery system may be comprised of rechargeable batteries and the respective modules may be simply recharged by plugging into either a domestic supply of alternating current or a DC source such as the electrical system of a motor vehicle.

While the two taillight modules are depicted as separate units, it may be desired in some situations to provide a single large taillight module for use on a towed vehicle. In yet other instances, functions other than run, brake and turn may be included. For example, tallights may be further adapted to flash in a particular emergency or warning pattern. All of the foregoing variations and modifications are well within the abilities of one of skill and in light of such possible modifications, it should be kept in mind that the foregoing drawings, discussions and description are merely meant to illustrate one particular embodiment of the invention and not be limitations upon the practice thereof. It is the following claims, including all equivalents, which are meant to define the scope of the invention.

What is claimed is:

1. A wireless taillight system comprising:
   (A) a transmitting module adapted to be disposed in operative association with the taillight energizing circuitry of a vehicle, said module including:
      input means operatively connected to said taillight energizing circuitry and adapted to receive taillight energizing signals therefrom;
      a signal generator adapted to generate a first group of radio frequency control signals at a first frequency in response to the energizing signals from the right-side taillights of the vehicle and a second group of radio frequency control signals at a second frequency in response to the energizing signals from the left-side taillights of the vehicle; and
      an antenna adapted to broadcast the radio frequency control signals;
   (B) a first taillight module configured to be removably mounted on a vehicle at a location remote from the transmitting module and including:
      a radio receiver-decoder adapted to receive the first group of radio frequency control signals broadcast by the antenna and generate lamp control signals corresponding thereto; and
      signaling means including a signal lamp and a lamp controller, said controller adapted to receive the lamp control signals and energize the lamp in accordance with the energization of the right-side taillights; and,
   (C) a second taillight module configured to be removably mounted on a vehicle at a location remote from the transmitting module and including:
      a radio receiver-decoder adapted to receive the second group of radio frequency control signals broadcast by the antenna and generate lamp control signals corresponding thereto; and,
      signaling means including a signal lamp and a lamp controller, said controller adapted to receive the lamp control signals and energize the lamp in accordance with the energization of the left-side taillights.

2. A wireless taillight system as in claim 1, wherein said first set of radio frequency signals are broadcast at approximately 27 MHZ, and the second set of radio frequency control signals are broadcast at approximately 49 MHZ.

3. A wireless taillight system as in claim 1, wherein said input means is adapted to receive taillight energizing signals from the vehicle corresponding to run, stop and turn functions and wherein the signal generator is adapted to provide differing radio frequency control signals for each of said taillight energizing signals.

4. A wireless taillight system as in claim 1, wherein said input means includes a jack adapted to connect the transmitting module to the taillight energizing circuitry of the vehicle.

5. A wireless taillight system as in claim 1, wherein each of said taillight modules includes a magnetic mount adapted to affix the module to a metallic surface.

6. A wireless taillight system as in claim 1, wherein each of said taillight modules further includes an antenna.

7. A wireless taillight system as in claim 1, wherein said signaling means includes a plurality of lamps.

8. A wireless taillight system as in claim 7, wherein said lamps are adapted to indicate run, stop and turn functions.

9. A wireless taillight system as in claim 1, wherein the signal generator of the transmitting module has associated therewith a logic center.

10. A wireless taillight system as in claim 1, wherein said taillight module includes a logic center adapted to decode received radio frequency control signals, generate lamp control signals corresponding thereto and energize the lamp in response to the lamp control signals.

11. A wireless taillight system comprising:
   (A) a transmitting module adapted to be disposed in operative association with the taillight energizing circuitry of a vehicle, the module including:
      (i) an input connector adapted to be connected to the taillight energizing circuitry of the vehicle so as to receive taillight energizing signals therefrom;
      (ii) a first group of relays adapted to receive taillight energizing signals corresponding to the left brake, turn and run taillight function of the vehicle and to provide outputs corresponding thereto;
      (iii) a first transmitter operating at a first radio frequency and adapted to receive the outputs of the first group of relays, said transmitter having associated therewith a logic center adapted to provide a plurality of discrete radio frequency signals at said first wavelength corresponding to said left turn, brake and run functions;

(iv) a second group of relays adapted to receive the taillight energizing signals corresponding to the right brake, turn and run functions and provide output signals corresponding thereto;

(v) a second radio frequency transmitter operating at a second wavelength and adapted to receive the outputs of the second group of relays, said transmitter having associated therewith a logic center adapted to provide a plurality of discrete output signals at said second wavelength corresponding to said right turn, brake and run functions; and (vi) an antenna in operative communication with each of said transmitters and adapted to broadcast the radio frequency signals;

(B) a first taillight module disposed remote from the transmitting module and including:

(i) a radio receiver having associated therewith an antenna and adapted to receive radio signals at said first wavelength;

(ii) a logic center in operative association with said receiver and adapted to decode the received radio frequency control signals and generate lamp control signals corresponding thereto;

(iii) at least one lamp operatively connected to the logic center so as to be energized by lamp control signal provided thereby; and (iv) a power supply adapted to energize the receiver and lamp;

(C) a second taillight module disposed remote from the transmitting module and including:

(i) a radio receiver having associated therewith an antenna and adapted to receive radio signals at said second wavelength;

(ii) a logic center in operative association with said receiver and adapted to decode the received radio frequency control signals and generate lamp control signals corresponding thereto;

(iii) at least one lamp operatively connected to the logic center so as to be energized by lamp control signals provided thereby; and (iv) a power supply adapted to energize the receiver and lamp.

* * * * *